Patented Nov. 25, 1924.

1,516,701

UNITED STATES PATENT OFFICE.

THOMAS K. BERNTSON, DECEASED, LATE OF PITTSBURGH, PENNSYLVANIA; BY LILLIAN BERNTSON, EXECUTRIX, OF PITTSBURGH, PENNSYLVANIA, ASSIGNOR, BY MESNE ASSIGNMENTS, TO JOHN W. GARLAND, INC., OF PITTSBURGH, PENNSYLVANIA.

PROCESS OF TREATING CORNCOBS AND PRODUCT THEREOF.

No Drawing. Original application filed January 21, 1921, Serial No. 439,003. Divided and this application filed November 19, 1921. Serial No. 516,503.

*To all whom it may concern:*

Be it known that I, LILLIAN BERNTSON, a citizen of the United States, and a resident of Pittsburgh, Pa., executrix of the last will and testament of Thomas K. Berntson, deceased, late a citizen of the United States, and a resident of Pittsburgh, Pa., do hereby respectfully represent that the said Thomas K. Berntson did during his lifetime invent certain new and useful Improvements in and Pertaining to Processes of Treating Corncobs and Product Thereof, of which the following is a specification.

The present invention relates to the utilization of corn cobs, and the present application is a division of a copending application, Serial No. 439,003, filed January 21, 1921.

The present invention relates to the utilization of corn cobs by destructively distilling them whereby the corn cobs are reduced to charcoal and vapors and gases are evolved. In such operation the cobs are preferably placed in a closed vessel which is subjected to external heating. The vapors and gases leaving the destructive distillation retort or receptacle are conveyed through a condensing apparatus in which a condensate is produced and the residual uncondensed gases may be used as fuel, either for heating the retorts in which the destructive distillation is carried out, or for any other purpose. The liquor produced in the condenser is itself one of the novel materials produced in the present process, this liquor under ordinary circumstances contains among other things, tar rich in creosote, acetic acid, methyl alcohol, and a small amount of acetone, and water. This condensate may be worked up in the same manner in which the condensate from the destructive distillation of wood is ordinarily worked up, the ordinary processes involving the conversion of the acetic acid into calcium acetate, which calcium acetate can, if desired, be used for the preparation of acetone. The composition, as above stated, is that produced from ordinary air dry corn cobs. In case the cobs under treatment contain very great quantities of water (i. e. when the cobs are wet, instead of being dry), the condensate will naturally contain substantially more water.

Experience has demonstrated that from one ton of the crude material, there can readily be produced, among other things, the following valuable products:

| | |
|---|---|
| Tar | 50 lbs. |
| Crude calcium acetate | 120 lbs. |
| Crude methyl alcohol | 2.5 gallons. |
| Charcoal | 560 lbs. |
| Combustible gas | 6500 cubic feet. |

It seems unnecessary to state that the present invention is of importance as effecting a substantial conservation of wood now used for destructive distillation, since corn cobs are annually available to the amount of many tons, and this material is at present virtually a waste product, the major portion of the same not being utilized for any usable purpose.

In carrying out the process, the corn cobs are placed in a closed receptacle or retort and are heated, in substantially the same manner as is ordinarily employed in the destructive distillation of wood, and the gases and vapors are drawn off and treated in substantially the same manner as the gases and vapors evolved in the destructive distillation of wood. An ordinary wood distilling plant can be used in conducting the process.

What is claimed is:

1. A process which comprises destructively distilling a mass of corn cobs in a closed receptacle, by heat generated extraneously of the destructive distillation reaction, and leading the gaseous and vaporous products of reaction to a condenser.

2. A process which comprises destructively distilling corn cobs, and condensing the major part at least of the vaporous products of reaction.

LILLIAN BERNTSON,
*Executrix.*